(12) United States Patent
Ohki

(10) Patent No.: US 9,032,783 B2
(45) Date of Patent: May 19, 2015

(54) BEARING PART, BEARING, AND METHOD FOR INSPECTING BEARING PART

(75) Inventor: Chikara Ohki, Kuwana (JP)

(73) Assignee: NTN Corporation, Osaka (JP)

( * ) Notice: Subject to any disclaimer, the term of this patent is extended or adjusted under 35 U.S.C. 154(b) by 299 days.

(21) Appl. No.: 13/637,954

(22) PCT Filed: Mar. 29, 2011

(86) PCT No.: PCT/JP2011/057849
§ 371 (c)(1),
(2), (4) Date: Sep. 27, 2012

(87) PCT Pub. No.: WO2011/122632
PCT Pub. Date: Oct. 6, 2011

(65) Prior Publication Data
US 2013/0019666 A1 Jan. 24, 2013

(30) Foreign Application Priority Data

Mar. 29, 2010 (JP) ................................. 2010-075370

(51) Int. Cl.
*F16C 29/00* (2006.01)
*C23C 8/32* (2006.01)
*C21D 1/06* (2006.01)
(Continued)

(52) U.S. Cl.
CPC ... *C23C 8/32* (2013.01); *C21D 1/06* (2013.01); *C21D 9/40* (2013.01); *F16C 33/62* (2013.01); *F16C 33/64* (2013.01); *F16C 33/32* (2013.01); *F16C 2240/40* (2013.01); *F16C 2202/04* (2013.01); *F16C 2223/16* (2013.01); *F16C 2240/08* (2013.01); *C23C 8/56* (2013.01);
(Continued)

(58) Field of Classification Search
CPC . G01N 3/40; G01N 19/06; G01N 2203/0078; G01N 2203/008
See application file for complete search history.

(56) References Cited

U.S. PATENT DOCUMENTS

| 6,066,068 | A | 5/2000 | Takemura et al. | |
|---|---|---|---|---|
| 2002/0040743 | A1* | 4/2002 | Hirakawa et al. | 148/318 |
| 2003/0059632 | A1* | 3/2003 | Inoue | 428/457 |

FOREIGN PATENT DOCUMENTS

| EP | 0718513 A1 | 6/1996 |
|---|---|---|
| EP | 0835949 A1 | 4/1998 |

(Continued)

OTHER PUBLICATIONS

Chinese Office Action issued in Application No. 201180017309.6 dated Dec. 30, 2013.

(Continued)

*Primary Examiner* — Paul West
(74) *Attorney, Agent, or Firm* — McDermott Will & Emery LLP

(57) ABSTRACT

An inspection method which quantitatively and simply assures a nitrogen concentration in a carbonitriding-treated bearing part, and a bearing part and a bearing for which a nitrogen concentration is quantitatively assured are obtained. An inner race, an outer race, and balls as bearing parts are each a bearing part made of JIS standard SUJ2 and having a carbonitrided layer formed in a surface thereof, wherein, after heat treatment at a heating temperature of 500° C. for a retention time of one hour is performed, a Vickers hardness at a position with a depth of 30 μm from the surface is higher than a Vickers hardness at a core portion, which is a region where the carbonitrided layer is not formed in a thickness direction of the bearing part, by not less than 130 HV.

11 Claims, 13 Drawing Sheets

(51) Int. Cl.
  *C21D 9/40* (2006.01)
  *F16C 33/62* (2006.01)
  *F16C 33/64* (2006.01)
  *F16C 33/32* (2006.01)
  *C23C 8/56* (2006.01)
  *C23C 8/76* (2006.01)
  *C23C 8/80* (2006.01)

(52) U.S. Cl.
  CPC ... *C23C8/76* (2013.01); *C23C 8/80* (2013.01); *F16C 2204/66* (2013.01)

(56) References Cited

FOREIGN PATENT DOCUMENTS

| EP | 1143018 A2 | 10/2001 |
|---|---|---|
| EP | 2025765 A1 | 2/2009 |
| JP | 5-240253 A | 9/1993 |
| JP | 2962817 B2 | 10/1999 |
| JP | 11-304795 A | 11/1999 |
| JP | 2009-229288 A | 10/2009 |

OTHER PUBLICATIONS

Supplementary European Search Report EP 11762856.0 dated Apr. 30, 2014.

S. Alwart et al., "Low-Temperature Nitrocarburizing", Advanced Materials & Processes, America Society for Metals. Metals Park, Ohio, US, vol. 154, No. 3, Sep. 1, 1998, pp. 41-43, XP000778078.

International Search Report issued in International Application No. PCT/JP2011/057849 issued on Jun. 14, 2011.

Kurabe etal., "Rolling Fatigue Characteristics of Carburized or Carbonitrided 1% Cr Steel at Elevated Temperatures", Iron and Steel, vol. 11, (1967), pp. 1305-1308.

Watanabe et al., "Effects of Nitrogen Content on Microstructure and Resistance to Softening during Tempering of Carbo-Nitrided Chromium Alloy Steels", Heat Treatment, vol. 40, (2000), pp. 18-24.

"Chemical Heat Treatment Technology," edited by Qi Sheng et al., Chemical Industry Press, Dec. 31, 2006, p. 76, with partial English translation.

Chinese Office Action issued in Chinese Application No. 201180017309.6 dated Aug. 19, 2014, with English translation.

* cited by examiner

BEARING PART, BEARING, AND METHOD FOR INSPECTING BEARING PART

RELATED APPLICATIONS

This application is the U.S. National Phase under 35 U.S.C. §371 of International Application No. PCT/JP2011/057849, filed on Mar. 29, 2011, which in turn claims the benefit of Japanese Application No. 2010-075370, filed on Mar. 29, 2010, the disclosures of which Applications are incorporated by reference herein.

TECHNICAL FIELD

The present invention relates to a bearing part, a bearing, and a method for inspecting a bearing part. More specifically, the present invention relates to a bearing part, a bearing, and a method for inspecting a bearing part subjected to carbonitriding treatment.

BACKGROUND ART

It has been conventionally qualitatively known that carbonitriding treatment is effective to extend rolling contact fatigue life of a rolling bearing (see for example "Rolling Fatigue Characteristics of Carburized or Carbonitrided 1% Cr Steel at Elevated Temperatures" by Hyojiro Kurabe et al., Iron and Steel, vol. 11, (1967), p. 1305 (hereinafter referred to as Non-Patent Literature 1) and Japanese Patent No. 2962817 (hereinafter referred to as Patent Literature 1). Further, in recent years, it has become clear that carbonitriding treatment is also effective in a method for evaluating scratched contact fatigue life of a rolling bearing, which is a more quantitative method, as described in Japanese Patent Laying-Open No. 2009-229288 (hereinafter referred to as Patent Literature 2). For example, it has been found that, if a nitrogen concentration in a ground uppermost surface is not less than 0.1 mass %, the life is extended to the extent that its statistically significant difference from that of a non-nitrided part is reliably recognized.

Accordingly, if it is possible to provide a rolling bearing part which is quality-assured to have a nitrogen concentration of not less than 0.1 mass % in a ground uppermost surface of a carbonitrided part, safety of a rolling bearing is ensured more reliably, and safety of mechanical equipment using the rolling bearing is improved, providing a great social advantage as a result.

At present, however, a nitrogen concentration in steel can be quantified only by a method performed using analysis equipment such as an EPMA (Electron Probe Micro Analyzer) and a GDS (Glow Discharge Spectrometer), and such measurement requires a great number of man-hours. Therefore, if a method using analysis equipment as described above is adopted as an inspection method for quality assurance, the rolling bearing becomes very expensive, which is not practical.

In addition, a method for qualitatively evaluating the degree of nitridation by utilizing the characteristics of nitrogen which has entered steel that "the hardness after high-temperature tempering is higher than that of a non-nitrided portion" is described, for example, in "Effects of Nitrogen Content on Microstructure and Resistance to Softening during Tempering of Carbo-Nitrided Chromium Alloy Steels" by Youichi Watanabe et al., Heat Treatment, vol. 40, (2000), p. 18 (hereinafter referred to as Non-Patent Literature 2), and the like.

CITATION LIST

Patent Literature

PTL 1: Japanese Patent No. 2962817
PTL 2: Japanese Patent Laying-Open No. 2009-229288

Non Patent Literature

NPL 1: "Rolling Fatigue Characteristics of Carburized or Carbonitrided 1% Cr Steel at Elevated Temperatures" by Hyojiro Kurabe et al., Iron and Steel, vol. 11, (1967), p. 1305
NPL 2: "Effects of Nitrogen Content on Microstructure and Resistance to Softening during Tempering of Carbo-Nitrided Chromium Alloy Steels" by Youichi Watanabe et al., Heat Treatment, vol. 40, (2000), p. 18

SUMMARY OF INVENTION

Technical Problem

It is also conceivable to qualitatively evaluate a depth of nitridation of a carbonitriding-treated bearing part by measuring distribution of a cross sectional hardness of the bearing part after high-temperature tempering, utilizing the characteristics of nitrogen in steel as described above.

However, with a method as described above, a nitrogen concentration of a carbonitriding-treated member (for example, a bearing part) has not been quantitatively assured. In order to economically and reliably improve safety of mechanical equipment using a bearing part and a bearing as described above, there have been demands for an inspection method which quantitatively assures a nitrogen concentration in a simple way, as well as for a bearing part and a bearing for which such a nitrogen concentration is quantitatively assured.

The present invention has been made to solve aforementioned problems, and one object of the present invention is to provide an inspection method which quantitatively and simply assures a nitrogen concentration in a carbonitriding-treated bearing part, and a bearing part and a bearing for which a nitrogen concentration is quantitatively assured.

Solution to Problem

A bearing part in accordance with the present invention is a bearing part made of JIS standard SUJ2 and having a carbonitrided layer formed in a surface thereof, wherein, after heat treatment at a heating temperature of 500° C. for a retention time of one hour is performed, a Vickers hardness at a position with a depth of 30 μm from the surface is higher than a Vickers hardness at a core portion, which is a region where the carbonitrided layer is not formed in a thickness direction of the bearing part, by not less than 130 HV.

As described later, the inventor has obtained findings that, in the bearing part made of JIS standard SUJ2, there is a correlation between a Vickers hardness and a nitrogen concentration in the carbonitrided layer subjected to heat treatment under conditions as described above, and that nitrogen distribution is shifted toward an inner side in the thickness direction by a predetermined distance (30 μm) due to the heat treatment. Thus, the Vickers hardness at the position with the depth of 30 μm from the surface subjected to heat treatment as described above is higher than that in a region not subjected to carbonitriding treatment by a predetermined value, in accordance with the nitrogen concentration at the position (i.e., the nitrogen concentration in the surface of the bearing part before the heat treatment is performed). Therefore, by setting a reference value for an improvement amount of the Vickers hardness beforehand in accordance with a designed nitrogen concentration in the surface of the bearing part before the heat treatment is performed (for example, if the designed nitrogen concentration is 0.1 mass %, the reference value for the improvement amount of the Vickers hardness is set to 130 HV), and determining whether or not a difference between a measurement value of the Vickers hardness at the position with the depth of 30 μm from the surface subjected to the heat treatment and a measurement value of the Vickers hardness at the core portion, which is a region other than the carbonitrided layer, satisfies the reference value (i.e., whether or not the difference is more than the reference value), whether or not the nitrogen concentration in the surface of the bearing part is not less than the designed nitrogen concentration can be inspected. As a result, the bearing part in accordance with the present invention can assure that the nitrogen concentration in the surface before the heat treatment is not less than 0.1 mass %.

Preferably, in the bearing part, after the heat treatment at the heating temperature of 500° C. for the retention time of one hour is performed, a Vickers hardness at a position with a depth of 70 μm from the surface is higher than the Vickers hardness at the core portion by not less than 80 HV. Here, the maximum distance in a depth direction between a position having a nitrogen concentration of 0.1 mass % and a position having a nitrogen concentration of 0.06 mass % in the carbonitrided layer of the bearing part is 40 μm, as described later. Therefore, if a difference between a Vickers hardness at a region located further closer to the inner side in the thickness direction by 40 μm in addition to the distance for which the nitrogen distribution is shifted (30 μm) toward the inner side in the thickness direction due to the heat treatment and the Vickers hardness at the core portion is not less than 80 HV (i.e., if the region has a nitrogen concentration of not less than 0.06 mass %), it can be reliably assured that the nitrogen concentration in the surface of the carbonitrided layer before the heat treatment is not less than 0.1 mass %.

Further, as described later, the difference between the Vickers hardnesses at a region within the carbonitrided layer and at the core portion, and the nitrogen concentration have a linear relationship when the nitrogen concentration is in a range of about 0 to 0.1 mass %. Therefore, if the nitrogen concentration used for determination is set to, for example, 0.06 mass %, which is close to substantially the center of the range exhibiting the linear relationship, a relatively good correlation between the difference in the Vickers hardness and the nitrogen concentration is obtained, and thus correctness of the determination can be improved.

A bearing part in accordance with the present invention is a bearing part made of JIS standard SUJ2 and having a carbonitrided layer formed in a surface thereof, wherein, after heat treatment at a heating temperature of 500° C. for a retention time of one hour is performed, a Vickers hardness at a position with a depth of 70 μm from the surface is higher than a Vickers hardness at a core portion, which is a region where the carbonitrided layer is not formed in a thickness direction of the bearing part, by not less than 80 HV.

Here, the inventor has obtained findings that there is a correlation between the Vickers hardness and the nitrogen concentration in the carbonitrided layer subjected to heat treatment under conditions as described above, that the nitrogen distribution is shifted toward the inner side in the thickness direction by a certain distance (30 μm) due to the heat treatment, and that, as described above, the maximum distance in the depth direction between the position having the nitrogen concentration of 0.1 mass % and the position having the nitrogen concentration of 0.06 mass % in the carbonitrided layer of the bearing part is 40 μm. Thus, the Vickers hardness at the position with the depth of 30 μm from the surface subjected to heat treatment as described above is higher than that in a region not subjected to carbonitriding treatment by a predetermined value, in accordance with the nitrogen concentration at the position (i.e., the nitrogen concentration in the surface of the bearing part before the heat treatment is performed).

In addition, as described later, a difference between a Vickers hardness at a region having a nitrogen concentration of 0.06 mass % and the Vickers hardness at the core portion is 80 HV, and the absolute value of the difference is increased with an increase in the nitrogen concentration. Accordingly, if the above difference related to the Vickers hardness at the position with the depth of 70 μm from the surface is not less than 80 HV as described above, it is recognized that the nitrogen concentration at the position is not less than 0.06 mass %. Further, since the nitrogen concentration tends to be increased toward the surface side from the position, and the distance between the position having the nitrogen concentration of 0.1 mass % and the position having the nitrogen concentration of 0.06 mass % is 40 μm at a maximum, it is recognized that the nitrogen concentration at the position 30 μm from the surface is not less than 0.1 mass %.

Thus, the nitrogen concentration in the surface of the bearing part before the heat treatment can be verified from the difference between the Vickers hardness at the position with the depth of 70 μm from the surface and the Vickers hardness at the core portion. As a result, the bearing part in accordance with the present invention can assure that the nitrogen concentration in the surface before the heat treatment is not less than 0.1 mass %.

In the bearing part, the nitrogen concentration in the surface of the carbonitrided layer may be not less than 0.1 mass %. In this case, the life of the bearing part can be reliably extended.

In the bearing part, the carbonitrided layer may be formed by carbonitriding treatment performed at a treatment temperature in a temperature range of not less than a point $A_1$ and not more than a point $A_{cm}$. In this case, the carbonitrided layer can be reliably formed in the bearing part. Here, point $A_1$ refers to a point corresponding to a temperature at which the structure of steel starts transformation from ferrite to austenite when the steel is heated. In addition, point $A_{cm}$ refers to a point corresponding to a temperature at which cementite in hypereutectoid steel is completely dissolved during heating.

In the bearing part, the carbonitrided layer may be formed by carbonitriding treatment performed at a treatment temperature in a temperature range of, for example, not less than 840° C. and not more than 860° C. In this case, the carbonitrided layer can be reliably formed in the bearing part.

A bearing in accordance with the present invention is a bearing manufactured using the bearing part described above. With such a configuration, a bearing with a reliably extended life when compared with a bearing using a non-nitrided bearing part can be obtained by quantitatively assuring the nitrogen concentration in the surface of the carbonitrided layer.

A method for inspecting a bearing part in accordance with the present invention includes the steps of: preparing a bearing part made of JIS standard SUJ2 and having a carbonitrided layer formed in a surface thereof; performing heat treatment on the bearing part; measuring, after the heat treatment, a first Vickers hardness at a position with a summed depth from the surface, the summed depth being obtained by adding a first distance to a grinding allowance for the surface, and a second Vickers hardness at a core portion, which is a region where the carbonitrided layer is not formed in a thickness direction of the bearing part; and determining whether or not the first Vickers hardness is higher than the second Vickers hardness by a reference value.

With such a configuration, the nitrogen concentration in the surface of the bearing part can be quantitatively assured based on the inventor's new findings that, in the bearing part made of JIS standard SUJ2, there is a correlation between the Vickers hardness and the nitrogen concentration in the carbonitrided layer subjected to heat treatment under predetermined conditions, and that the nitrogen distribution is shifted toward the inner side in the thickness direction by a predetermined distance due to the heat treatment.

In the method for inspecting a bearing part described above, the heat treatment may be heat treatment at a heating temperature of 500° C. for a retention time of one hour, the first distance may be 30 μm, and the reference value may be 130 HV.

In this case, whether or not the nitrogen concentration in the surface of the bearing part before the heat treatment is not less than 0.1 mass % can be determined based on the inventor's findings that there is a correlation between the Vickers hardness and the nitrogen concentration after heat treatment as described above is performed, and that the nitrogen distribution is shifted toward the inner side in the thickness direction by about 30 μm due to the heat treatment.

In the method for inspecting a bearing part described above, the heat treatment may be heat treatment at a heating temperature of 500° C. for a retention time of one hour, the first distance may be 70 μm, and the reference value may be 80 HV.

In the inspection method described above, the nitrogen concentration confirmed in the surface of the carbonitrided layer in the bearing part may be not less than 0.1 mass %.

In the inspection method described above, the carbonitrided layer may be formed by carbonitriding treatment performed at a treatment temperature in a temperature range of not less than a point $A_1$ and not more than a point $A_{cm}$.

In the inspection method described above, the carbonitrided layer may be formed by carbonitriding treatment performed at a treatment temperature in a temperature range of not less than 840° C. and not more than 860° C.

Advantageous Effects of Invention

According to the present invention, a bearing part in which a nitrogen concentration in a surface thereof is not less than 0.1 mass % can be reliably provided.

DESCRIPTION OF EMBODIMENTS

Figure 1:
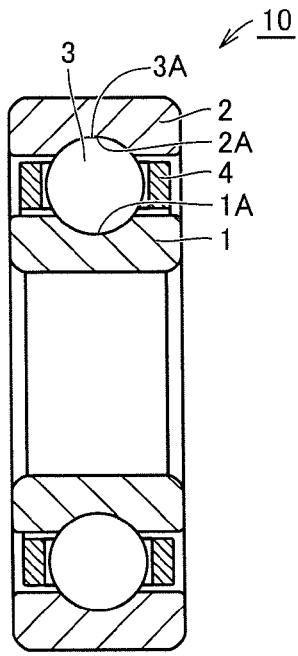
FIG. 1 is a schematic cross sectional view showing an embodiment of a bearing in accordance with the present invention.

Hereinafter, an embodiment of the present invention will be described with reference to the drawings. In the drawings below, identical or corresponding parts will be designated by the same reference numerals, and the description thereof will not be repeated.

Referring to FIG. 1, a bearing 10 includes an annular outer race 2, an annular inner race 1 arranged inside outer race 2, and a plurality of balls 3 as rolling elements arranged between outer race 2 and inner ace 1 and held in an annular holder 4, inner ace 1, outer race 2, and balls 3 being made of JIS standard SUJ2. An outer raceway surface 2A is formed in an inner peripheral surface of outer race 2, and an inner raceway surface 1A is formed in an outer peripheral surface of inner race 1. Outer race 2 and inner race 1 are arranged such that inner raceway surface 1A and outer raceway surface 2A face each other. Further, the plurality of balls 3 come into contact with inner raceway surface 1A and outer raceway surface 2A at ball rolling surfaces 3A as their surfaces, are circumferentially arranged at a predetermined pitch by holder 4, and thereby held on an annular raceway in a freely rolling manner. With the above configuration, outer race 2 and inner race 1 of bearing 10 are relatively rotatable with respect to each other. At least outer raceway surface 2A of outer race 2 is a region where a carbonitrided layer is formed. Inner raceway surface 1A of inner race 1 is also a region where a carbonitrided layer is formed. Further, a carbonitrided layer is formed in the surface of each ball 3. Furthermore, a nitrogen concentration in surfaces of the carbonitrided layers in inner race 1, outer race 2, and balls 3 is not less than 0.1 mass %.

In addition, from a different viewpoint, inner race 1, outer race 2, and balls 3 as bearing parts in accordance with the present invention described above are each a bearing part made of JIS standard SUJ2 and having a carbonitrided layer formed in a surface thereof, wherein, after heat treatment at a heating temperature of 500° C. for a retention time of one hour (i.e., high-temperature tempering) is performed, a Vickers hardness at a position with a depth of 30 μm from the surface is higher than a Vickers hardness at a core portion, which is a region where the carbonitrided layer is not formed in a thickness direction of the bearing part (inner race 1, outer race 2, ball 3), by not less than 130 HV. Such a configuration can assure that the nitrogen concentration in the surface in the bearing part is not less than 0.1 mass % as described later, and can extend the life of a bearing using the bearing part as a result.

Preferably, in the bearing part (for example, inner race 1, outer race 2, ball 3), after the heat treatment at the heating temperature of 500° C. for the retention time of one hour is performed, a Vickers hardness at a position with a depth of 70 μm from the surface is higher than the Vickers hardness at the core portion by not less than 80 HV. Such a configuration can reliably assure that the nitrogen concentration in the surface of the carbonitrided layer before the heat treatment is not less than 0.1 mass %.

Further, as described later, a difference between the Vickers hardnesses at a region within the carbonitrided layer and at the core portion, and the nitrogen concentration have a linear relationship when the nitrogen concentration is in a range of about 0 to 0.1 mass %. Therefore, if the nitrogen concentration used for determination is set to a value close to substantially the center of the range exhibiting the linear relationship (for example, 0.06 mass %), a relatively good correlation between the difference in the Vickers hardness and the nitrogen concentration is obtained, and thus correctness of the determination can be improved.

In addition, the bearing part (inner race 1, outer race 2, ball 3) in accordance with the present invention is a bearing part made of JIS standard SUJ2 and having a carbonitrided layer formed in a surface thereof, wherein, after heat treatment at a heating temperature of 500° C. for a retention time of one hour is performed, a Vickers hardness at a position with a depth of 70 μm from the surface is higher than a Vickers hardness at a core portion, which is a region where the carbonitrided layer is not formed in a thickness direction of the bearing part, by not less than 80 HV. Such a configuration can reliably assure that the nitrogen concentration in the surface of the carbonitrided layer before the heat treatment is not less than 0.1 mass %, as described later.

In the bearing part (inner race 1, outer race 2, ball 3), the nitrogen concentration in the surface of the carbonitrided layer, for example in the rolling surface, is not less than 0.1 mass %. In this case, the life of the bearing part (inner race 1, outer race 2, ball 3) can be reliably extended.

In the bearing part such as inner race 1, outer race 2, and ball 3, the carbonitrided layer may be formed by carbonitriding treatment performed at a treatment temperature in a temperature range of not less than a point $A_1$ and not more than a point $A_{cm}$. In this case, the carbonitrided layer can be reliably formed in the bearing part such as inner race 1, outer race 2, and ball 3.

In the bearing part such as inner race 1, outer race 2, and ball 3, the carbonitrided layer may be formed by carbonitriding treatment performed at a treatment temperature in a temperature range of, for example, not less than 840° C. and not more than 860° C. In this case, the carbonitrided layer can be reliably formed in the bearing part such as inner race 1, outer race 2, and ball 3.

Bearing 10 in accordance with the present invention is a bearing manufactured using the bearing part such as inner race 1, outer race 2, and ball 3. With such a configuration, a bearing with a reliably extended life when compared with a bearing using a non-nitrided bearing part can be obtained by quantitatively assuring the nitrogen concentration in the surface of the carbonitrided layer.

The nitrogen concentration in the surface of the bearing part such as inner race 1, outer race 2, and ball 3 constituting bearing 10 shown in FIG. 1 can be inspected by an inspection method as described below. Hereinafter, a method for inspecting the bearing part in accordance with the present invention will be described with reference to FIG. 2.

Figure 2:
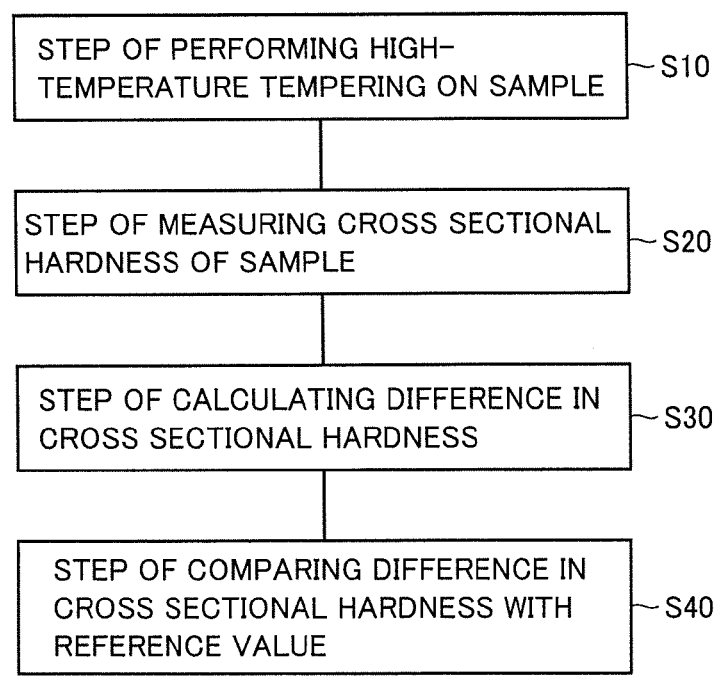
FIG. 2 is a flowchart for illustrating a method for inspecting a bearing part in accordance with the present invention.

As shown in FIG. 2, in the method for inspecting the bearing part in accordance with the present invention, a sample as the bearing part such as inner race 1, outer race 2, and ball 3 subjected to carbonitriding treatment and the like is prepared to perform the step of performing high-temperature tempering on the sample (S10). In this step (S10), a tempering temperature (heating retention temperature) can be set to, for example, not less than 300° C. and not more than 700° C., preferably not less than 400° C. and not more than 600° C., and more preferably 500° C., and a tempering time (retention time) can be set to, for example, one hour. By performing such heat treatment, the carbonitrided layer has a Vickers hardness higher than a Vickers hardness in a region other than the carbonitrided layer.

Next, the step of measuring a cross sectional hardness of the sample (S20) is performed as shown in FIG. 2. Specifically, for example, if inner race 1 (see FIG. 1) is used as a sample, a test piece is cut out of the sample, and a cross sectional hardness (Vickers hardness) of the test piece is measured at a predetermined position in the thickness direction from an outer diameter side toward an inner diameter side. The hardness may be measured, for example, at two positions 30 μm and 1 mm from a surface (surface on the outer diameter side), or two positions 70 μm and 1 mm from the surface, or three positions 30 μm, 70 μm, and 1 mm from the surface.

Next, the step of calculating a difference in cross sectional hardness (S30) is performed as shown in FIG. 2. Specifically, a difference between the Vickers hardness at the position 1 mm from the surface corresponding to the core portion as the region other than the carbonitrided layer and the Vickers hardness at the position 30 μm or 70 μm from the surface is calculated.

Next, the step of comparing the difference in cross sectional hardness with a reference value (S40) is performed. Specifically, the difference in cross sectional hardness calculated in the above step (S30) is compared with a predetermined reference value to determine whether or not the value of the difference satisfies the reference value (i.e., whether or not the value of the difference is not less than the reference value). If the value of the difference satisfies the reference value, it can be confirmed that the nitrogen concentration in the surface before the heat treatment (high-temperature tempering) is performed on the sample is a predetermined value (for example, 0.1 mass %).

To summarize the characteristic feature of the method for inspecting the bearing part described above, the inspection method includes the steps of: preparing a bearing part (for example, inner race 1, outer race 2, ball 3) made of JIS standard SUJ2 and having a carbonitrided layer formed in a surface thereof; performing heat treatment on the bearing part (S10); measuring, after the heat treatment, a first Vickers hardness at a position with a summed depth from the surface, the summed depth being obtained by adding a first distance to a grinding allowance for the surface, and a second Vickers hardness at a core portion, which is a region where the carbonitrided layer is not formed in a thickness direction of the bearing part (S20); and determining whether or not the first Vickers hardness is higher than the second Vickers hardness by a reference value (S30, S40).

Thereby, the nitrogen concentration in the surface of the bearing part such as inner race 1, outer race 2, and ball 3 can be quantitatively assured based on the inventor's new findings that, in the bearing part such as inner race 1 made of JIS standard SUJ2, there is a correlation between the Vickers hardness and the nitrogen concentration in the carbonitrided layer subjected to heat treatment under predetermined conditions, and that nitrogen distribution is shifted toward an inner side in the thickness direction by a predetermined distance due to the heat treatment, as described later.

In the method for inspecting the bearing part described above, the heat treatment may be heat treatment at a heating temperature of 500° C. for a retention time of one hour, the first distance may be 30 µm, and the reference value may be 130 HV.

In this case, whether or not the nitrogen concentration in the surface of the bearing part before the heat treatment is not less than 0.1 mass % can be determined based on the inventor's findings that there is a correlation between the Vickers hardness and the nitrogen concentration after heat treatment (high-temperature tempering) as described above is performed, and that the nitrogen distribution is shifted toward the inner side in the thickness direction by about 30 µm due to the heat treatment.

In the method for inspecting the bearing part described above, the heat treatment may be heat treatment at a heating temperature of 500° C. for a retention time of one hour, the first distance may be 70 µm, and the reference value may be 80 HV. In this case, whether or not the nitrogen concentration in the surface of the bearing part before the heat treatment is not less than 0.1 mass % can be determined with higher accuracy.

In the inspection method described above, the nitrogen concentration confirmed in the surface of the carbonitrided layer in the bearing part is not less than 0.1 mass %. In this case, since the nitrogen concentration in the surface is at a level that can achieve the effect of extending the life of the bearing part, the bearing part determined by the inspection method as passing the inspection can reliably achieve the effect of extending the life.

In the inspection method described above, the carbonitrided layer may be formed by carbonitriding treatment performed at a treatment temperature in a temperature range of not less than a point $A_1$ and not more than a point $A_{cm}$. Further, in the inspection method described above, the carbonitrided layer may be formed by carbonitriding treatment performed at a treatment temperature in a temperature range of not less than 840° C. and not more than 860° C.

Example 1

Hereinafter, in order to actually apply the inspection method in accordance with the present invention described above to a bearing part made of JIS standard SUJ2, the positions for measuring hardnesses and the reference value were determined through a procedure as described below.

(1) Test Piece and Experimental Method
(1-1) Introduction

Firstly, it is necessary to determine the heating retention temperature and the retention time in the high-temperature tempering which have a high correlation with the nitrogen concentration. Since transformation by the high-temperature tempering is a thermally-activated process, increasing the heating retention temperature and increasing the retention time have the same meaning, and it is considered meaningless to use the both as variables. Thus, in the present specification, the heating retention temperature suitable for an inspection was determined as described below, by setting the retention time to a fixed time (one hour) and changing the heating retention temperature to 300° C., 400° C., 500° C., 600° C., and 700° C. to investigate a heating retention temperature at which a difference in hardness was clearest.

Further, it is considered that a difference in hardenability and a difference in cooling rate during hardening due to a difference in chemical components in each material may affect a hardness after the hardening and also may affect a hardness after the high-temperature tempering. Thus, as described above, the absolute value itself of a cross sectional hardness is not used as an indicator for the inspection, but a hardness difference between a hardness at a non-nitrided position deep from a surface layer (core portion) (here, for example, a hardness at a depth of 1 mm from an uppermost surface subjected to heat treatment) and a hardness at a position with a certain depth within a nitrided region was adopted as an indicator for the present inspection method.

(1-2) Target Test Pieces

Table 1 shows chemical components of test pieces subjected to an investigation. The materials were all made of JIS standard SUJ2, and subjected to carbonitriding treatment in various heat treatment furnaces and under various heat treatment atmospheres. It is noted that the carbonitriding treatment temperature was included in a temperature range of not less than 840° C. and not more than 860° C.

TABLE 1

| Test Piece No. | Chemical Components (mass %) | | | | | | | |
|---|---|---|---|---|---|---|---|---|
| | C | Si | Mn | Ni | Cr | Mo | Cu | O* |
| 1 | 1.03 | 0.25 | 0.35 | 0.01 | 1.50 | 0 | 0.01 | 4 |
| 2 | unknown | | | | | | | |
| 3 | 0.98 | 0.27 | 0.47 | 0.05 | 1.45 | 0.02 | 0.10 | 6 |
| 4 | 1.00 | 0.27 | 0.35 | 0.02 | 1.51 | 0 | 0.01 | 7 |
| 5 | 1.01 | 0.24 | 0.35 | 0.01 | 1.49 | 0 | 0.01 | 3 |
| 6 | 0.99 | 0.26 | 0.37 | 0.02 | 1.44 | 0 | 0.01 | 5 |
| 7 | unknown | | | | | | | |
| 8 | 0.98 | 0.25 | 0.34 | 0.07 | 1.43 | 0.03 | 0.10 | 6 |
| 9 | 0.98 | 0.25 | 0.34 | 0.07 | 1.43 | 0.03 | 0.10 | 6 |
| 10 | 0.98 | 0.25 | 0.34 | 0.07 | 1.43 | 0.03 | 0.10 | 6 |

*ppm

Specifically, test piece No. 1 was subjected to treatment under conditions of a carbonitriding treatment temperature of 850° C., a treatment time of 120 minutes (min.) (hereinafter expressed as "850° C.×120 min."), an undecomposed $NH_3$ fraction of 0.2 vol. %, and a carbon activity of 0.9. Test piece No. 2 was subjected to treatment under conditions of 840° C.×70 min., an undecomposed ammonia fraction of 0.1 vol. %, and a carbon activity of 0.85. Test piece No. 3 was subjected to treatment under conditions of 850° C.×120 min., an undecomposed ammonia fraction of 0.1 vol. %, and a carbon activity of 0.9. Test piece No. 4 was subjected to treatment under conditions of 850° C.×90 min., an undecomposed ammonia fraction of 0.1 vol. %, and a carbon activity of 0.9. Test piece No. 5 was subjected to treatment under conditions of 850° C.×90 min., an undecomposed ammonia fraction of 0.1 vol. %, and a carbon activity of 0.9.

In addition, test piece No. 6 was subjected to treatment under conditions of 850° C.×90 min., an undecomposed ammonia fraction of 0.13 vol. %, and a carbon activity of 0.9. Test piece No. 7 was subjected to treatment under conditions of 850° C.×150 min., an undecomposed ammonia fraction of 0.1 vol. %, and a carbon activity of 0.85. Test piece No. 8 was subjected to treatment under conditions of 850° C.×150 min., an undecomposed ammonia fraction of 0.25 vol. %, and a carbon activity of 0.9. Test piece No. 9 was subjected to treatment under conditions of 850° C.×180 min., an undecomposed ammonia fraction of 0.3 vol. %, and a carbon activity of 0.95. Test piece No. 10 was subjected to treatment under conditions of 850° C.×90 min., an undecomposed ammonia fraction of 0.2 vol. %, and a carbon activity of 0.9.

(1-3) Method for Measuring Nitrogen Concentration

Figure 3:
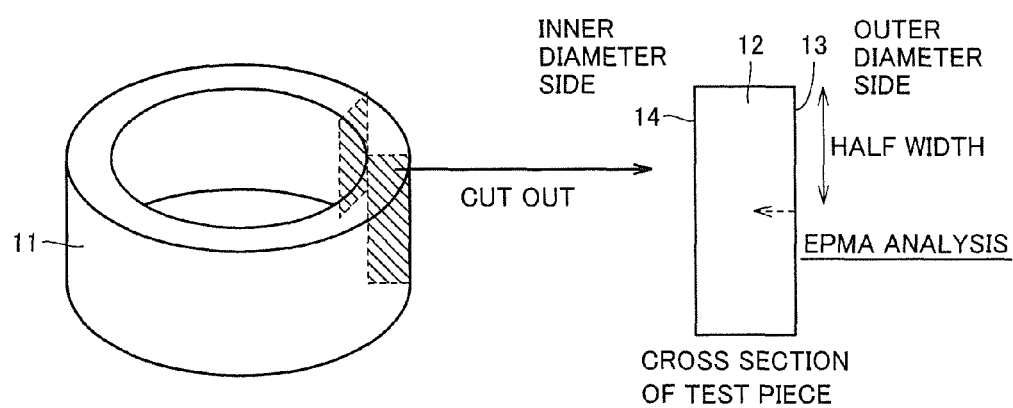
FIG. 3 is a schematic view showing a specimen for measuring a nitrogen concentration.

In order to investigate correlation between a cross sectional hardness and a nitrogen concentration of a sample subjected to the high-temperature tempering, it is necessary to measure nitrogen concentration distribution in the sample (steel). Line analysis with an EPMA was used to measure the nitrogen concentration in the steel subjected to the carbonitriding treatment. Quantification was performed by analyzing a calibration test piece having a known nitrogen concentration and using a calibration curve thereof. FIG. 3 shows a schematic view of a sample used for EPMA analysis and a measurement method.

It is assumed that, for example, inner race 1 (see FIG. 1) is used as a sample 11 as shown in FIG. 3. For sample 11, a nitrogen concentration in sample 11 subjected to the carbonitriding treatment was measured. Specifically, a test piece 12 as shown in FIG. 3 was cut out of sample 11, and line analysis with an EPMA was performed on a cut-out end surface at a central portion in a height direction of test piece 12 (i.e., at a position with a half width) along a direction from a surface 13 on an outer diameter side to a surface 14 on an inner diameter side of the test piece.

(1-4) Method for Measuring Cross Sectional Hardness

Hardness was measured at the cut-out end surface subjected to the EPMA analysis in the test piece described above in (1-3). As a measuring method, Vickers hardness measurement was performed using a micro Vickers hardness tester.

(2) Search for Retention Temperature for High-Temperature Tempering (2-1) Experiment Description In order to search for a tempering temperature (heating retention temperature) having a high correlation with the nitrogen concentration, the test pieces subjected to the carbonitriding treatment were subjected to tempering at a heating temperature of 180° C. for a retention time of two hours, and thereafter subjected to five types of high-temperature tempering at heating retention temperatures of 300° C., 400° C., 500° C., 600° C., and 700° C. for a retention time of one hour. The high-temperature tempering was performed in an air atmosphere. Then, cross sectional hardnesses of the test pieces treated under the respective conditions for the high-temperature tempering were measured. Here, measurement was performed on test pieces No. 8 and No. 9 which were under carbonitriding treatment conditions considered to cause a large amount of nitrogen to enter the test pieces.

(2-2) Experimental Results

Figure 4:
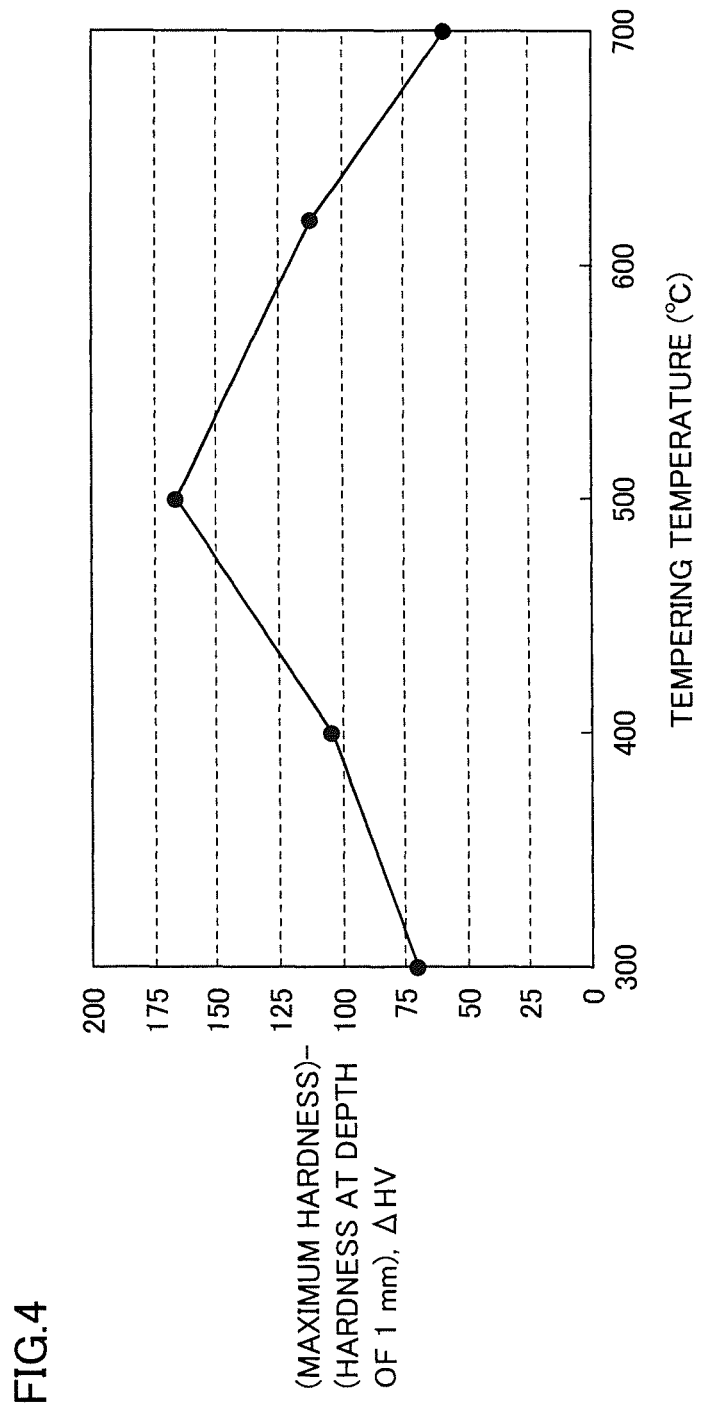
FIG. 4 is a graph showing relationship between a tempering temperature and a cross sectional hardness difference ΔHV as a difference between a maximum value of Vickers hardness and a Vickers hardness at a position with a depth of 1 mm.

FIG. 4 shows a graph compiling experimental results. The graph shown in FIG. 4 compiles the experimental results, with the tempering temperature on the axis of abscissas and the difference in cross sectional hardness (i.e., [the maximum value of the cross sectional hardness]–[the cross sectional hardness at a position with the depth of 1 mm from the uppermost surface subjected to the heat treatment]: also expressed as ΔHV) on the axis of ordinates. As can be seen from FIG. 4, difference ΔHV in cross sectional hardness was maximum after the high-temperature tempering at the heating retention temperature of 500° C. for the retention time of one hour. Difference ΔHV in cross sectional hardness at the heating retention temperature of 500° C. had a value about double that of difference ΔHV in cross sectional hardness after the high-temperature tempering at the heating retention temperature of 300° C. or 700° C. Accordingly, it is considered that the hardness after the tempering having a relatively high correlation with the nitrogen concentration is the hardness after the tempering at a heating retention temperature of about 500° C. Therefore, in an experiment below, measurement of the cross sectional hardness was performed on the test pieces subjected to high-temperature tempering at a heating retention temperature of 500° C. for a retention time of one hour.

Figure 5:
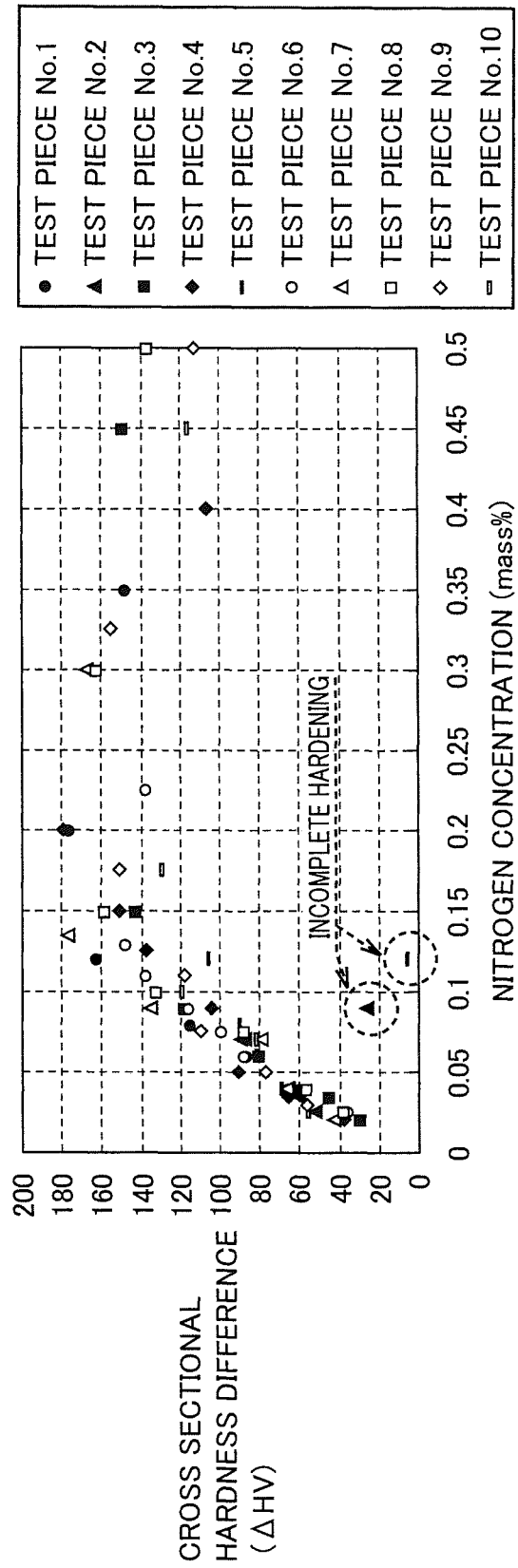
FIG. 5 is a graph showing relationship between the nitrogen concentration and the cross sectional hardness difference.

(2-3) Investigation of Relationship Between Nitrogen Concentration and Difference (ΔHV) in Cross Sectional Hardness Here, each test piece having a composition shown in Table 1 was subjected to the heat treatment at the heating retention temperature of 500° C. for the retention time of one hour as the high-temperature tempering, and thereafter a nitrogen concentration in each test piece was measured by the EPMA analysis as described with reference to FIG. 3. Further, a cross sectional hardness in a depth direction of the test piece was measured in the cut-out end surface of test piece 12 shown in FIG. 3. Then, relationship of a difference between a cross sectional hardness at a certain position in the depth direction and the cross sectional hardness at the position with the depth of 1 mm from the uppermost surface subjected to the heat treatment (hereinafter defined as a cross sectional hardness difference (ΔHV)) was investigated. FIG. 5 shows results thereof. In FIG. 5, the axis of abscissas represents the nitrogen concentration (unit: mass %), and the axis of ordinates represents the cross sectional hardness difference (ΔHV) (unit: Vickers hardness). It has been found from FIG. 5 that, when the nitrogen concentration is in a range of more than 0 and not more than 0.1 mass %, the correlation between the nitrogen concentration and the cross sectional hardness difference is strong, whereas when the nitrogen concentration is in a range of more than 0.1 mass %, the correlation between the nitrogen concentration and the cross sectional hardness difference is relatively weak. This is considered to be because incomplete hardening may occur in a region with a high nitrogen concentration, and nitrogen dissolved in the test piece does not necessarily contribute to a reduction in the decomposition rate of martensite.

Specifically, it is considered that data represented as dots surrounded by dashed lines in FIG. 5 are caused by a reduction in hardness due to occurrence of incomplete hardening. With these data removed, the relationship between the nitrogen concentration and the cross sectional hardness difference in the range of 0 to 0.1 mass % was extracted and compiled into FIG. 6.

Figure 6:
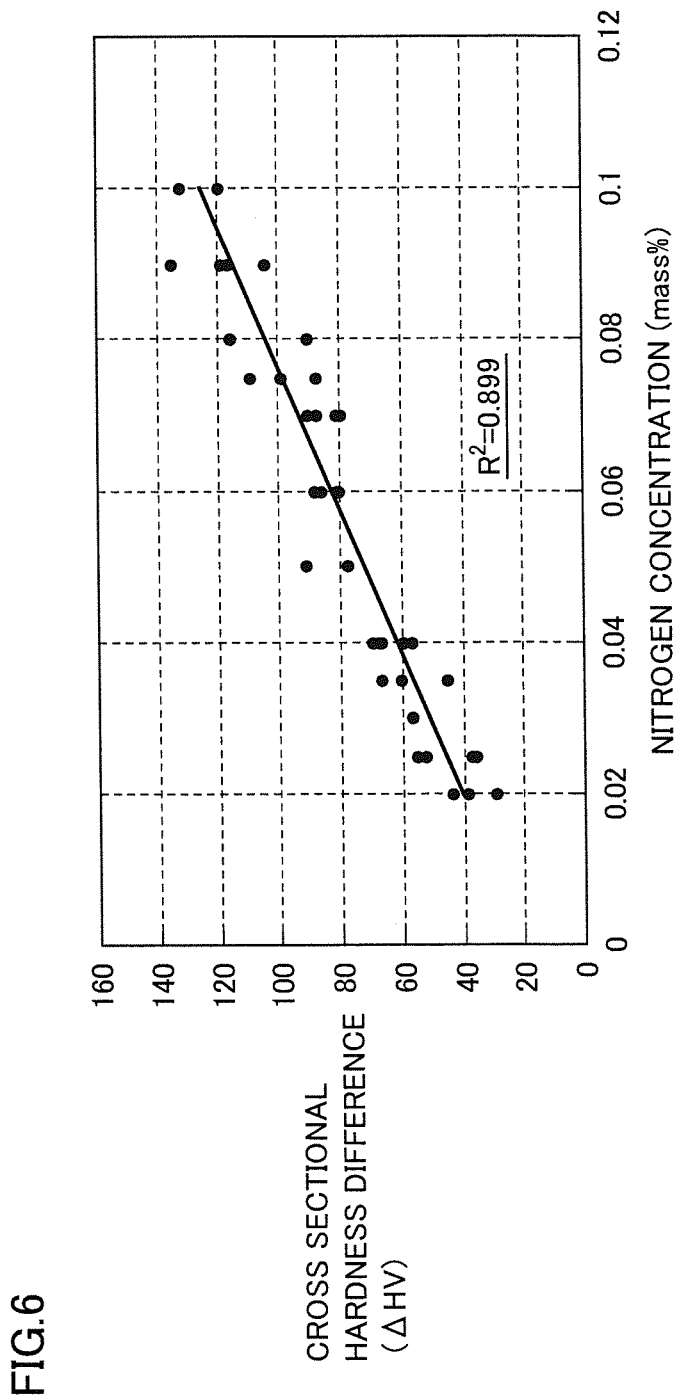
FIG. 6 is a graph showing relationship between the nitrogen concentration and the cross sectional hardness difference when the nitrogen concentration is in a range of not more than 0.1 mass %.

In the graph shown in FIG. 6, the axis of abscissas represents the nitrogen concentration (unit: mass %), and the axis of ordinates represents cross sectional hardness difference ΔHV (unit: Vickers hardness). When a correlation coefficient between the nitrogen concentration and the cross sectional hardness difference is calculated based on data of the graph shown in FIG. 6, a high correlation coefficient of 0.95 is obtained therebetween. Accordingly, it is considered that the nitrogen concentration can be predicted from the cross sectional hardness difference if the nitrogen concentration is in the range of 0 to 0.1 mass %.

(3) Construction of Inspection Method Providing Quality Assurance that Nitrogen Concentration in Ground Uppermost Surface is not Less than 0.1 Mass %

(3-1) Conversion from Cross Sectional Hardness Difference (ΔHV) to Nitrogen Concentration (Mass %)

Figure 7:
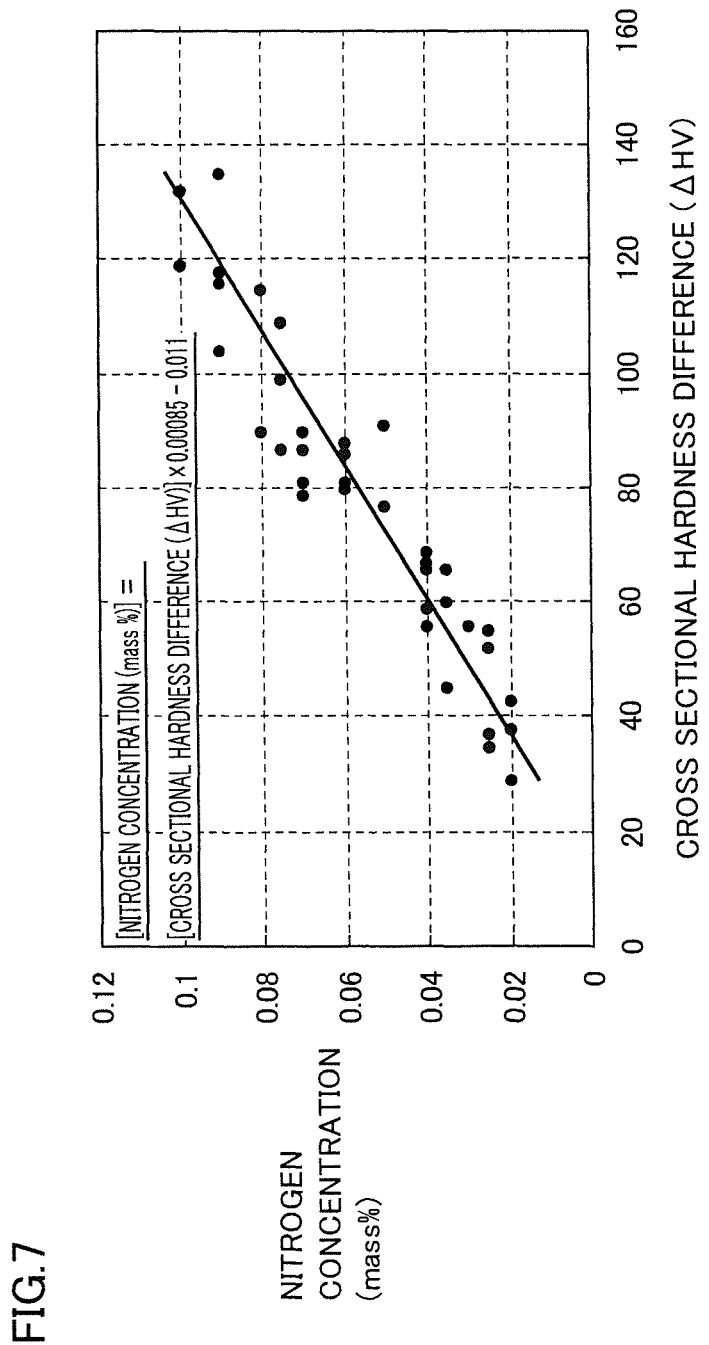
FIG. 7 is a graph showing relationship between the cross sectional hardness difference and the nitrogen concentration.

FIG. 7 is a graph with cross sectional hardness difference ΔHV (unit: Vickers hardness) on the axis of abscissas and the nitrogen concentration (unit: mass %) on the axis of ordinates, plotting the data shown in FIG. 6. From these data, an approximate equation expressing the relationship between the nitrogen concentration and the cross sectional hardness difference is determined. FIG. 7 also shows the approximate equation. As shown in FIG. 7, an experimental equation for determining the nitrogen concentration from the value of the cross sectional hardness difference is expressed by the following equation (1):

[nitrogen concentration (mass %)]=[cross sectional hardness difference (ΔHV)]×0.00085−0.011    Equation (1).

It is estimated from equation (1) that the nitrogen concentration at a position having a cross sectional hardness difference of, for example, 130 (ΔHV) is 0.1 mass %.

(3-2) Consideration Based on Experimental Equation

Here, for a rolling surface as a surface of a region where a carbonitrided layer is formed in the bearing part, an inspection method (quality assurance method) for assuring that the nitrogen concentration in a ground uppermost surface (i.e., a final uppermost surface of the bearing part) is a predetermined value (for example, specifically, not less than 0.1 mass %) is proposed, and a component (bearing part) of a rolling bearing for which the nitrogen concentration is assured is provided based on the inspection method. Accordingly, if an inspection based on the above inspection method is performed after the carbonitriding treatment and then finishing grinding is performed on the rolling surface of the bearing part, it is only necessary as a direct quality assurance method that the cross sectional hardness difference at a position with a depth considering a grinding allowance for the rolling surface is not less than 130, based on equation (1).

However, as can be seen from FIG. 5, when the nitrogen concentration is more than 0.1 mass %, the correlation between the cross sectional hardness difference and the nitrogen concentration is drastically reduced. Thus, if the nitrogen concentration of 0.1 mass % is used as a standard for the above inspection (quality assurance standard), there is a possibility that an error is likely to occur in an inspection result. Therefore, a nitrogen concentration of 0.06 mass %, which is an approximately central value in the effective range of the nitrogen concentration in the graph shown in FIG. 7, is adopted here as a quality assurance standard. In this case, according to equation (1), it is estimated that the nitrogen concentration at a position having a cross sectional hardness difference of 80 is 0.06 mass %.

(3-3) Calculation of Distance between Depth Position with Nitrogen Concentration of 0.06 Mass % and Depth Position with Nitrogen Concentration of 0.1 Mass %

Figure 8:
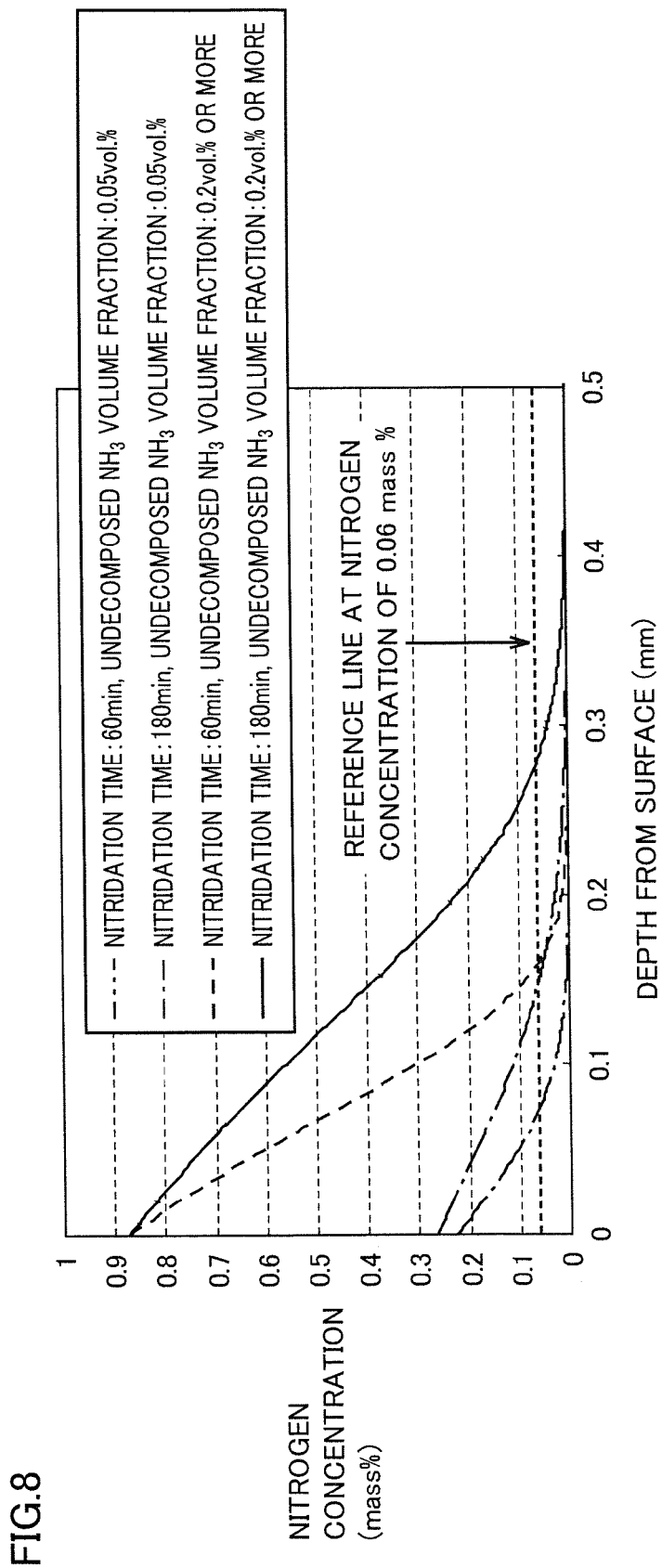
FIG. 8 is a graph showing relationship between a depth from a surface and a nitrogen concentration in each specimen.
Figure 9:
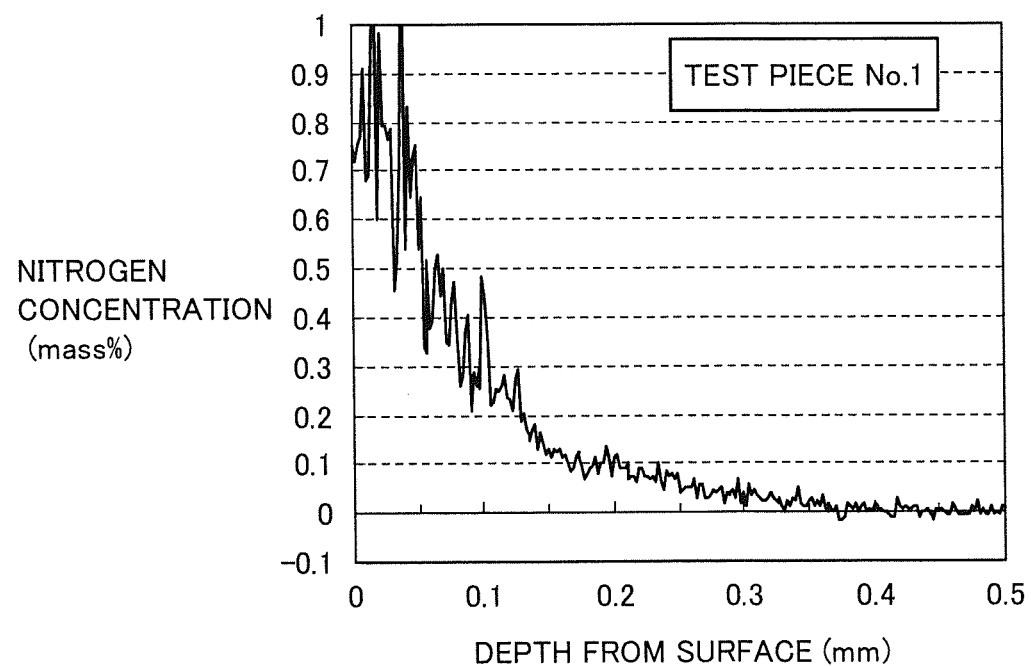
FIG. 9 is a graph showing relationship between a depth from a surface and a nitrogen concentration in a test piece after heat treatment is finished.
Figure 10:
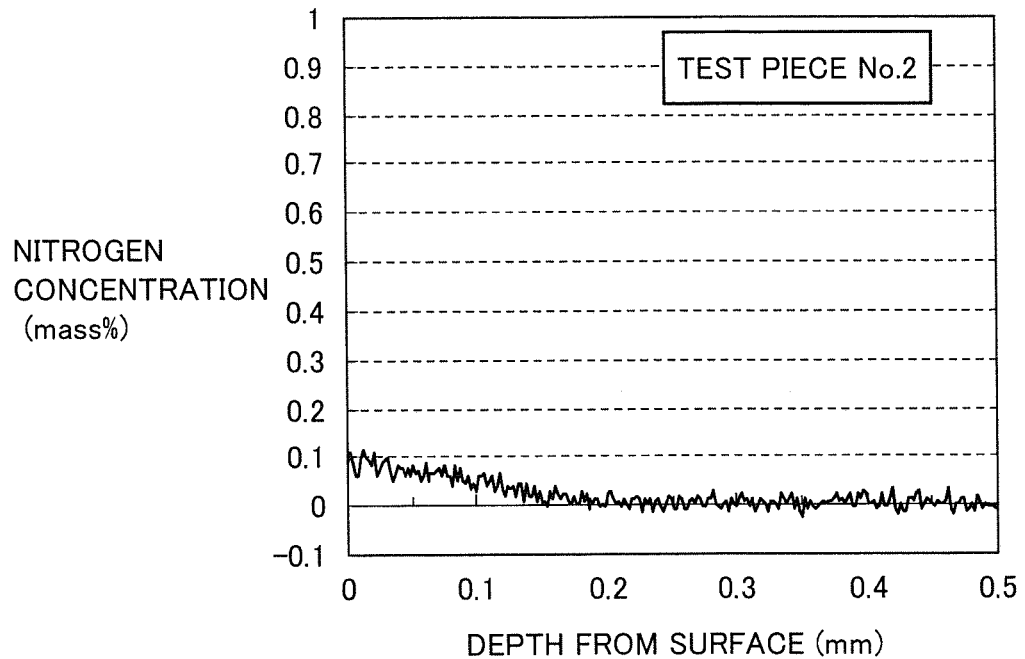
FIG. 10 is a graph showing relationship between a depth from a surface and a nitrogen concentration in a test piece after heat treatment is finished.
Figure 11:
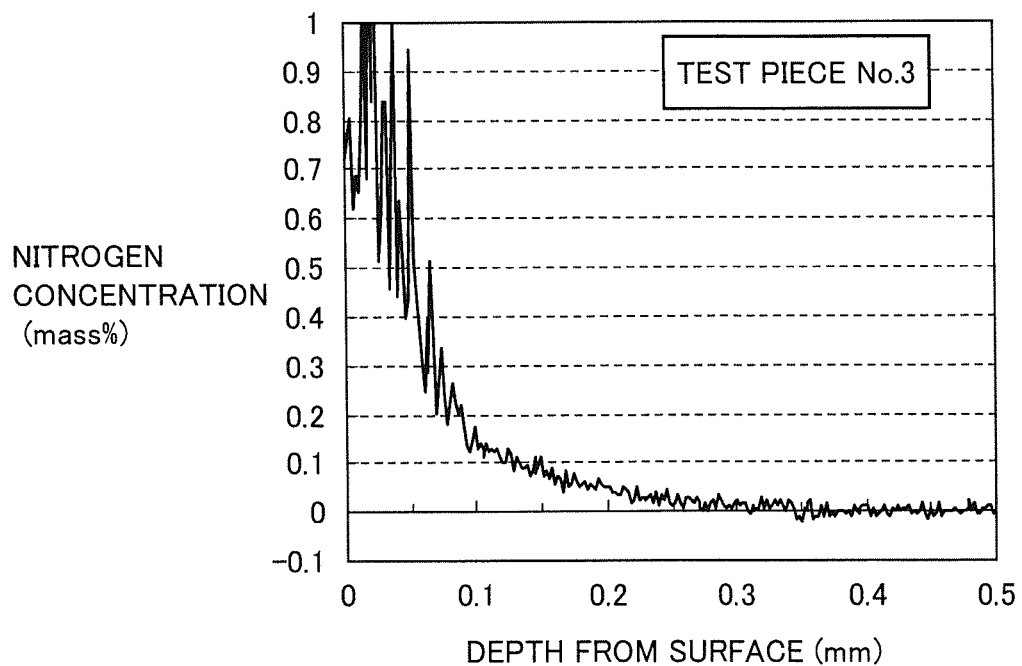
FIG. 11 is a graph showing relationship between a depth from a surface and a nitrogen concentration in a test piece after heat treatment is finished.
Figure 12:
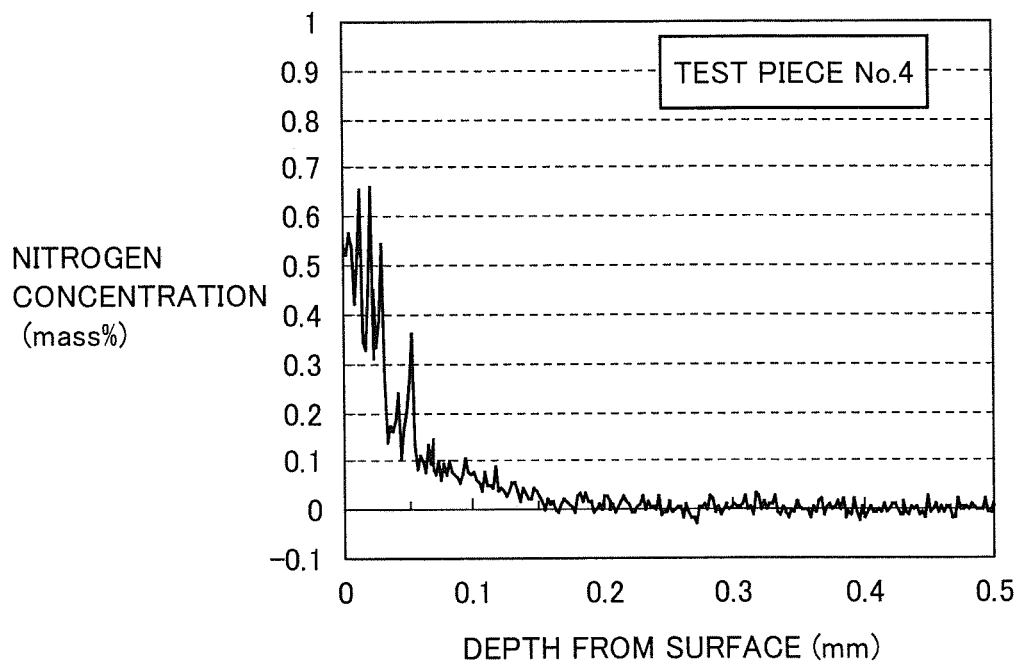
FIG. 12 is a graph showing relationship between a depth from a surface and a nitrogen concentration in a test piece after heat treatment is finished.
Figure 13:
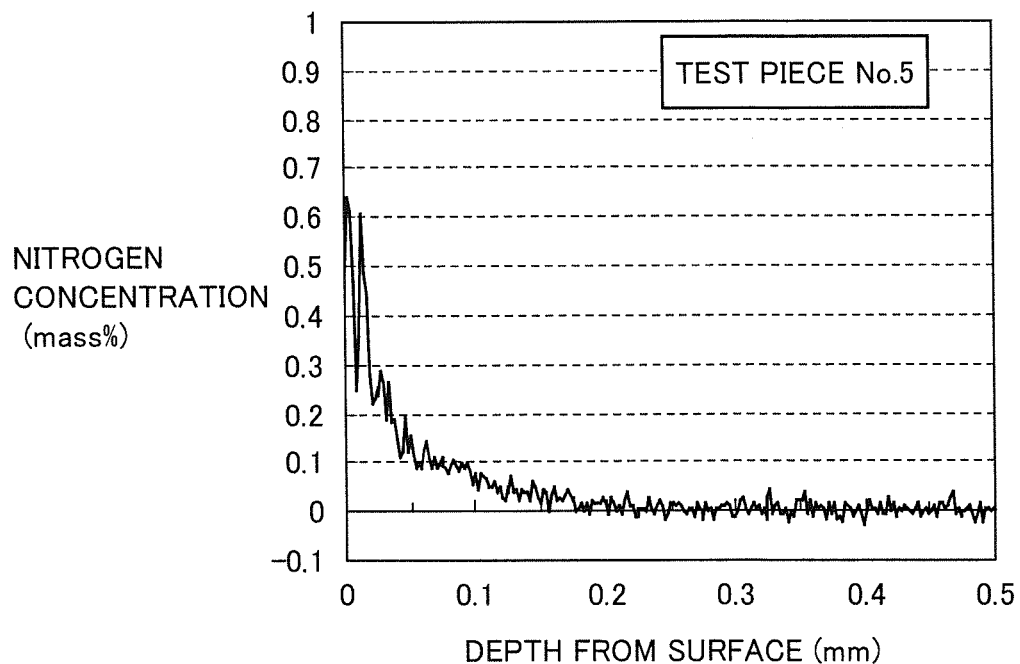
FIG. 13 is a graph showing relationship between a depth from a surface and a nitrogen concentration in a test piece after heat treatment is finished.
Figure 14:
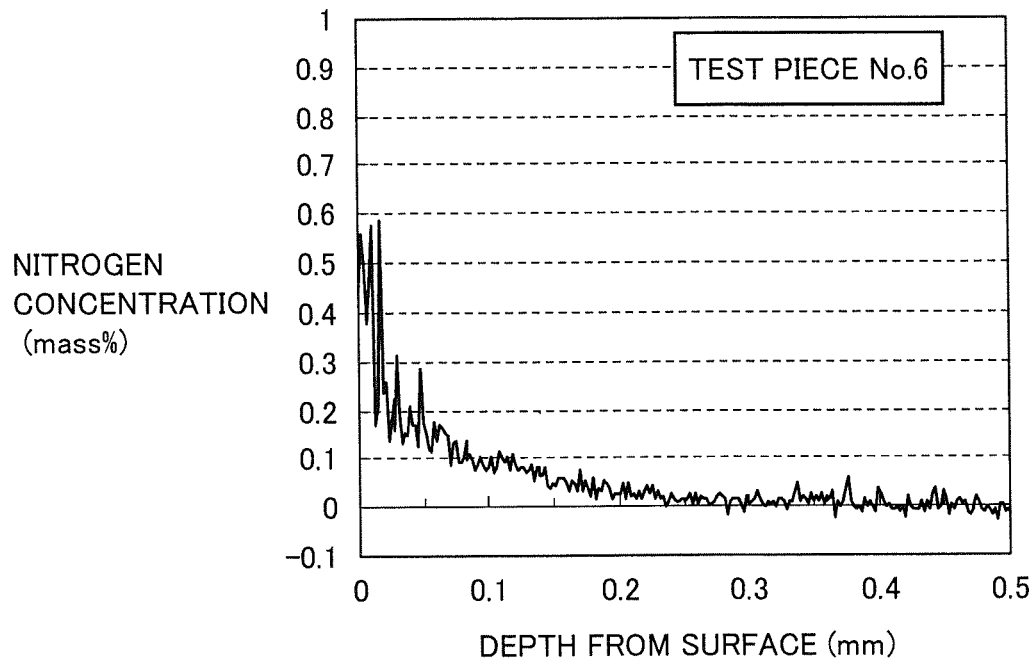
FIG. 14 is a graph showing relationship between a depth from a surface and a nitrogen concentration in a test piece after heat treatment is finished.
Figure 15:
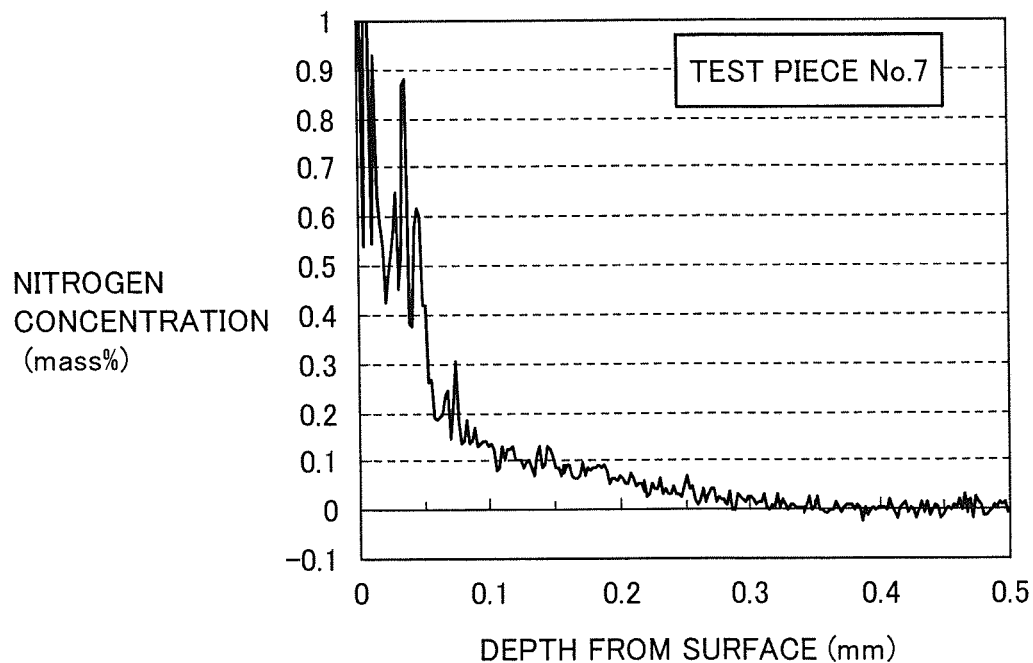
FIG. 15 is a graph showing relationship between a depth from a surface and a nitrogen concentration in a test piece after heat treatment is finished.
Figure 16:
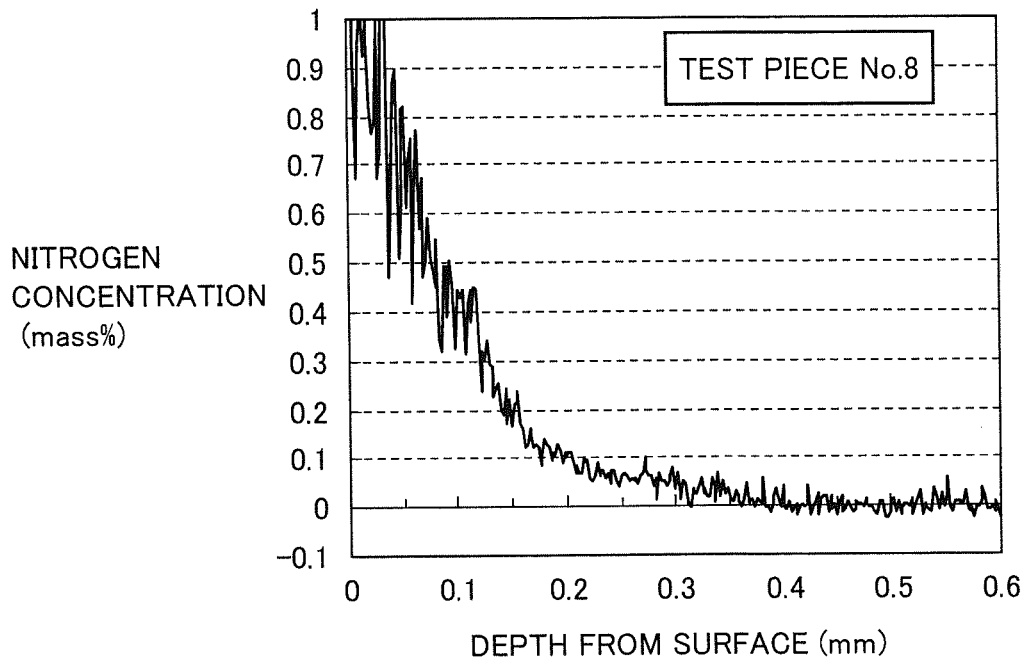
FIG. 16 is a graph showing relationship between a depth from a surface and a nitrogen concentration in a test piece after heat treatment is finished.
Figure 17:
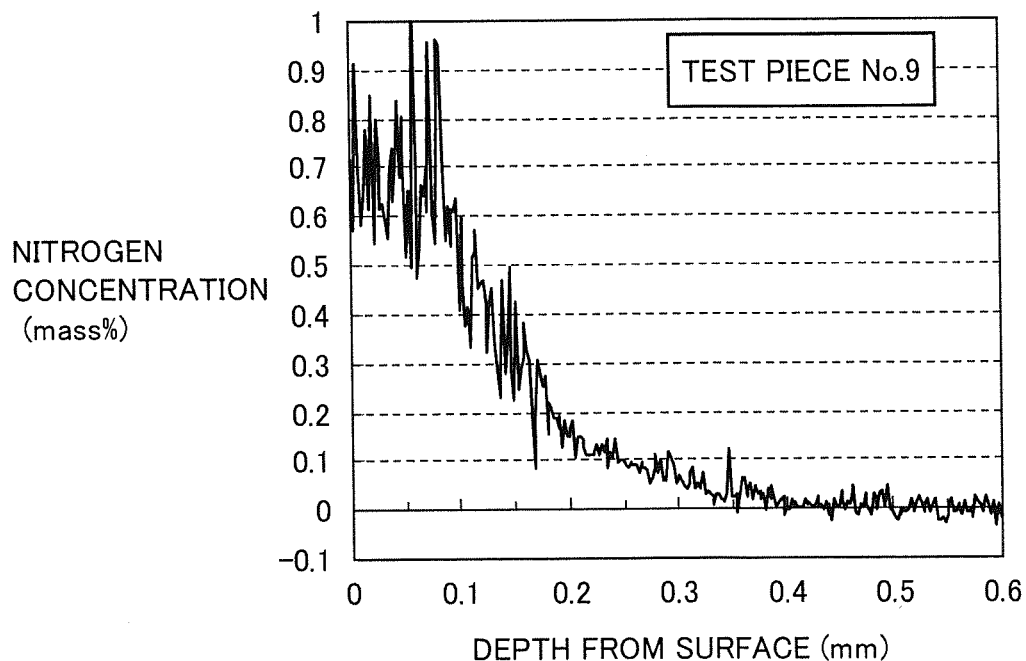
FIG. 17 is a graph showing relationship between a depth from a surface and a nitrogen concentration in a test piece after heat treatment is finished.
Figure 18:
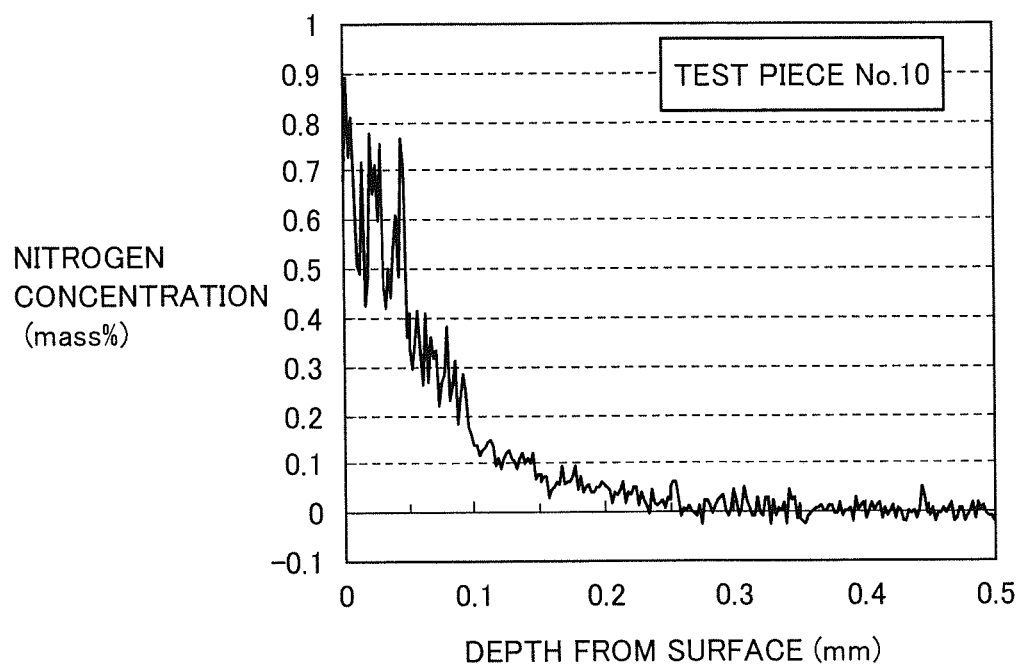
FIG. 18 is a graph showing relationship between a depth from a surface and a nitrogen concentration in a test piece after heat treatment is finished.

According to a nitrogen concentration distribution prediction equation (see "Nitrogen Concentration Distribution Prediction in SUJ2 Subjected to Carbonitriding Treatment" by Chikara Ohki, Iron and Steel, vol. 93, (2007), p. 220), practical nitrogen concentration distribution in a carbonitriding-treated part made of HS standard SUJ2 is considered to be within the range shown in FIG. 8. In the graph shown in FIG. 8, the axis of abscissas represents a depth from the surface of the carbonitriding-treated part (unit: mm), and the axis of ordinates represents the nitrogen concentration (unit: mass %). It has been found from FIG. 8 that the distance between a depth position having a nitrogen concentration of 0.06 mass % and a depth position having a nitrogen concentration of 0.1 mass % falls within a range of not less than 15 μm and not more than 40 μm as a practical range.

Thus, the maximum distance between the depth position having the nitrogen concentration of 0.1 mass % and the depth position having the nitrogen concentration of 0.06 mass % (i.e., having a cross sectional hardness difference of 80) is 40 μm. Accordingly, it is considered based on FIG. 8 and the like that the nitrogen concentration is not less than 0.1 mass % in a range from a position which is 40 μm closer to a surface side of the carbonitriding-treated part than the depth position having the nitrogen concentration of 0.06 mass %, to the surface. Therefore, if the cross sectional hardness difference (ΔHV) at a certain depth position is not less than 80, it can be assured that the nitrogen concentration in a region 40 μm closer to the surface from the depth position is not less than 0.1 mass %. It is noted that the nitrogen concentration in a region 40 μm shifted to the surface side from the depth position having the nitrogen concentration of 0.06 mass % in each of four conditions shown in FIG. 8 is calculated to have a value shown in Table 2.

TABLE 2

| Nitridation Time (min) | Undecomposed NH$_3$ Volume Fraction (vol. %) | Nitrogen Concentration in Ground Uppermost Surface (mass %) |
| --- | --- | --- |
| 60 | 0.05 | 0.14 |
| 180 | 0.05 | 0.11 |
| 60 | 0.2 or more | 0.20 |
| 180 | 0.2 or more | 0.12 |

It is noted that Table 2 shows a nitridation time (carbonitriding treatment time), an undecomposed NH$_3$ volume fraction, and a nitrogen concentration in the ground uppermost surface corresponding to the nitrogen concentration in the region 40 μm shifted to the surface side from the depth position having the nitrogen concentration of 0.06 mass %, in each condition. As can be seen from Table 2, in any of the four conditions shown in FIG. 8, the nitrogen concentration in the region is not less than 0.1 mass %.

(3-4) Influence of Nitrogen Movement by Tempering at Heating Retention Temperature of 500° C. for Retention Time of One Hour As described above in (3-1), it has been found that there is a strong correlation between the nitrogen concentration of not less than 0 and not more than 0.1 mass % and the cross sectional hardness difference (ΔHV) after the tempering at the heating retention temperature of 500° C. and the retention time of one hour. However, the inspection method (quality assurance method) to be proposed by the inventor of the present invention is to indicate that the nitrogen concentration before the high-temperature tempering at the heating retention temperature of 500° C. for the retention time of one hour is performed, that is, the nitrogen concentration in a ground uppermost surface of an actual product, is not less than 0.1 mass %. Thus, nitride concentration distribution was measured for each of test pieces No. 3, No. 8, No. 9, and No. 10 which were considered to have a large amount of nitrogen entering therein, in each of two cases, that is, before the high-temperature tempering (i.e., after the tempering treatment at the heating retention temperature of 180° C. for the retention time of two hours performed after the carbonitriding treatment), and after the high-temperature tempering (i.e., after the tempering treatment at the heating retention temperature of 500° C. for the retention time of one hour (hereinafter also described as "tempering of 500° C.×1 h"). Then, actual measurement values of the nitrogen concentration distributions were compared to investigate a moving distance of nitrogen due to the high-temperature tempering.

From the measurement values of the nitrogen concentration distributions in the above two cases, a depth of a region having a nitrogen concentration of 0.05 mass % and a depth of a region having a nitrogen concentration of 0.1 mass % in each specimen before and after the high-temperature tempering were obtained to calculate how far each region was moved by the high-temperature tempering. Table 3 shows results thereof.

TABLE 3

| Test Piece No. | Nitrogen Concentration (mass %) | Depth from Surface before Tempering of 500° C. × 1 h (μm) | Depth from Surface after Tempering of 500° C. × 1 h (μm) | Moving Distance by Tempering of 500° C. × 1 h (μm) | Average Value of Moving Distances (μm) |
|---|---|---|---|---|---|
| 3 | 0.05 | 190 | 210 | 20 | 31.3 |
| 8 |  | 270 | 310 | 40 |  |
| 9 |  | 310 | 350 | 40 |  |
| 10 |  | 200 | 225 | 25 |  |
| 3 | 0.1 | 125 | 150 | 25 | 28.8 |
| 8 |  | 200 | 240 | 40 |  |
| 9 |  | 240 | 270 | 30 |  |
| 10 |  | 130 | 150 | 20 |  |
|  |  |  |  | Total Average of Moving Distances (μm) | 30.0 |

Table 3 shows, from the left, the test piece No., the nitrogen concentration (unit: mass %) in the region where the depth from the specimen surface was measured, the depth from the test piece surface to the region (unit: μm) before the high-temperature tempering was performed, the depth from the test piece surface to the region (unit: μm) after the high-temperature tempering was performed, the moving distance (unit: μm) of the region in the depth direction by the high-temperature tempering, and the average value (unit: μm) of the moving distances of the region for each nitrogen concentration.

It has been found from Table 3 that both the region having the nitrogen concentration of 0.05 mass % and the region having the nitrogen concentration of 0.1 mass % were moved to an inner side of the test piece by the high-temperature tempering (tempering of 500° C.×1 h), by about 30 μm on average. Although it is calculated according to (3-3) described above that the nitrogen concentration is not less than 0.1 mass % from a region which is 40 μm closer to the surface side (i.e., shallower) than a region having a nitrogen concentration of 0.06 mass %, to the surface, it is necessary to consider the nitrogen moving distance described above due to the high-temperature tempering (tempering of 500° C.×1 h) in order to assure that the nitrogen concentration in the ground uppermost surface before the high-temperature tempering (tempering of 500° C.×1 h) is not less than 0.1 mass %. Specifically, since the maximum distance between the depth having the nitrogen concentration of 0.1 mass % and the depth having the nitrogen concentration of 0.06 mass % is 40 μm, and the nitrogen moving distance due to the high-temperature tempering (tempering of 500° C.×1 h) is 30 μm, a summed distance (70 μm) of the maximum distance (40 μm) and the nitrogen moving distance (30 μm) should be considered. Further, if the nitrogen concentration at a position with a depth obtained by adding a grinding allowance (only for one surface) for the carbonitriding-treated bearing part to the summed distance is not less than 0.06 mass % (that is, if the cross sectional hardness difference after the high-temperature tempering (tempering of 500° C.×1 h) is not less than 80), it can be assured that the nitrogen concentration in the ground uppermost surface before the high-temperature tempering (tempering of 500° C.×1 h) is not less than 0.1 mass %.

It is noted that, as shown in Table 3, the moving distances in the depth direction of the position having the nitrogen concentration of 0.05 mass % and the position having the nitrogen concentration of 0.1 mass % due to the high-temperature tempering (tempering of 500° C.×1 h) are substantially identical. Therefore, it is considered that the maximum distance between the depth position having the nitrogen concentration of 0.1 mass % and the depth position having the nitrogen concentration of 0.06 mass % calculated above in (3-3) does not vary significantly due to the high-temperature tempering (tempering of 500° C.×1 h).

(3-5) Concrete Procedure for Inspection (Concrete Procedure for Quality Assurance)

To summarize the experimental results and examination results described above, a concrete procedure for the inspection method for providing quality assurance that the nitrogen concentration in the ground uppermost surface of the rolling surface in the bearing part is not less than 0.1 mass % is as follows:

1) Cut a carbonitriding-treated sample (i.e., a bearing part for which heat treatment is completed), and perform the high-temperature tempering (tempering of 500° C.×1 h) described above thereon.

2) Prepare a test piece for measuring a cross sectional hardness (for example, fabricate a specimen for measuring a hardness by embedding the test piece in resin such that cross sectional hardness measurement can be performed). On this occasion, the test piece is prepared to expose its end surface on which the hardness measurement is to be performed, such that the hardness measurement can be performed at a predetermined position in the depth direction from a surface to serve as the rolling surface of the bearing part to the inner side of the bearing part.

3) Measure a cross sectional hardness (Vickers hardness) at a position with a depth of 1 mm (i.e., a position where no nitrogen enters: also referred to as the core portion) from the uppermost surface to serve as the rolling surface of the bearing part in the test piece.

4) Measure a cross sectional hardness (Vickers hardness) at a position with a depth of [the grinding allowance for one surface+70 μm] from the uppermost surface to serve as the rolling surface in the test piece. If a sample which has been already ground is used, the cross sectional hardness may be measured at a position with a depth of 70 μm from the uppermost surface.

5) Determine whether or not a difference between the cross sectional hardnesses measured above in 3) and 4) satisfies a reference value (for example, 80). For example, if the difference in cross sectional hardness calculated from the above measurement values is not less than 80 as the reference value, it is considered that the nitrogen concentration in the uppermost surface of the ground sample is not less than 0.1 mass %, and thus the sample is determined as passing the inspection.

The inspection method described above does not require introduction of a new facility, and can be said as a very simple inspection. It is noted that, in order to further improve reliability of the above inspection, it is desirable to adopt, as the measurement value in each of steps 3) and 4), an average value of measurement values obtained when N=2, although the number of man-hours for the inspection is slightly increased.

(4) Determination Using Inspection Method in Accordance with the Present Invention In order to confirm validity of the inspection method (quality assurance method) described above, the present inspection method was applied to test pieces to determine whether each test piece passed or failed the inspection, and compare their actual measurement values of the nitrogen concentration. The test pieces shown in Table 1 were used as the test pieces. Table 4 shows, from the left column, the test piece No., the grinding allowance for one surface of each test piece (unit: μm), the cross sectional hardness difference (ΔHV) as the difference between the cross sectional hardness at the position with the depth of [the grinding allowance+70 μm] from the surface and the cross sectional hardness at the position 1 mm from the surface after the high-temperature tempering (tempering of 500° C.×1 h), the result of pass/fail determination based on the present inspection method, and the actual measurement value of the nitrogen concentration (unit: mass %) at a position of the ground uppermost surface measured with an EPMA before the high-temperature tempering was performed.

less than 0.1 mass %. Therefore, the present inspection method (quality assurance method) can be considered as a method appropriate for determining that the nitrogen concentration at the position of the ground uppermost surface is not less than 0.1 mass %.

It is noted that, for reference, FIGS. 9 to 18 each show an actual measurement value of nitrogen concentration distribution in each test piece before the high-temperature tempering (tempering of 500° C.×1 h). In FIGS. 9 to 18, the axis of abscissas represents the depth from the surface (unit: mm), and the axis of ordinates represents the nitrogen concentration (unit: mass %).

Thus, in order to provide a bearing part and a bearing made of JIS standard SUJ2 in which the nitrogen concentration in a surface thereof is not less than 0.1 mass %, it is only necessary to measure cross sectional hardnesses at a position with a depth of [the grinding allowance for one surface+70 μm] from a surface of a test piece and at a position with a depth of 1 mm from the surface after the high-temperature tempering (tempering of 500° C.×1 h), and assure that a difference between the cross sectional hardnesses is not less than 80.

It is noted that, if grinding is performed before the high-temperature tempering, it is not necessary to take the grinding allowance for one surface into consideration to determine a position for measuring the cross sectional hardness. Further, if the nitrogen concentration in the surface of the test piece before the high-temperature tempering (for example, the ground surface thereof) is used as a reference value, it is only necessary to measure cross sectional hardnesses at a position with a depth of [the grinding allowance for one surface+30 μm] from the surface of the test piece and at a position with a depth of 1 mm from the surface after the high-temperature tempering (tempering of 500° C.×1 h), and assure that a difference between the cross sectional hardnesses is not less than 130.

It should be understood that the embodiment and example disclosed herein are illustrative and non-restrictive in every respect. The scope of the present invention is defined by the scope of the claims, rather than the embodiment described

TABLE 4

| Test Piece No. | Grinding Allowance for One Surface (μm) | Cross Sectional Difference at Position with Depth of Grinding Allowance + 70 μm (ΔHV) | Pass/Fail Determination | Actual Measurement Value of Nitrogen Concentration at Position of Ground Uppermost Surface before Tempering of 500° C. × 1 h (mass %) |
|---|---|---|---|---|
| 1 | 100 | 140 | Pass | 0.25 |
| 2 | 50 | 60 | Fail | 0.07 |
| 3 | 100 | 100 | Pass | 0.14 |
| 4 | 100 | 70 | Fail | 0.075 |
| 5 | 100 | 70 | Fail | 0.075 |
| 6 | 100 | 85 | Pass | 0.1 |
| 7 | 120 | 90 | Pass | 0.1 |
| 8 | 150 | 150 | Pass | 0.2 |
| 9 | 150 | 135 | Pass | 0.35 |
| 10 | 100 | 100 | Pass | 0.14 |

As is clear from Table 4, the actual measurement values of the nitrogen concentration at the positions of the ground uppermost surfaces of the test pieces that passed the inspection by the present inspection method were all not less than 0.1 mass %, and the actual measurement values of the nitrogen concentration at the positions of the ground uppermost surfaces of the test pieces that failed the inspection were all above, and is intended to include any modifications within the scope and meaning equivalent to the scope of the claims.

INDUSTRIAL APPLICABILITY

The present invention is particularly advantageously applicable to carbonitriding-treated bearing part and bearing.

REFERENCE SIGNS LIST

1: inner race, 1A: inner raceway surface, 2: outer race, 2A: outer raceway surface, 3: ball, 3A: ball rolling surface, 4: holder, 10: bearing, 11: sample, 12: test piece, 13: surface on the outer diameter side, 14: surface on the inner diameter side.

The invention claimed is:

1. A bearing part made of JIS standard SUJ2 and having a carbonitrided layer formed in a surface thereof,
   wherein, after heat treatment at a heating temperature of 500° C. for a retention time of one hour is performed, a Vickers hardness at a first position with a depth of 30 μm from said surface is higher than a Vickers hardness at a core portion, which is a region where said carbonitrided layer is not formed in a thickness direction of said bearing part, by not less than 130 HV,
   wherein a nitrogen concentration in said carbonitrided layer decreases from the surface of the bearing part to the core portion,
   a nitrogen concentration at the first position of said carbonitrided layer is not less than 0.1 mass %, and
   a nitrogen concentration at a depth position of not less than 15 μm and not more than 40 μm from a depth position having a nitrogen concentration of 0.1 mass % is 0.06 mass %.

2. The bearing part according to claim 1, wherein, after the heat treatment at the heating temperature of 500° C. for the retention time of one hour is performed, a Vickers hardness at a position with a depth of 70 μm from said surface is higher than the Vickers hardness at said core portion by not less than 80 HV.

3. The bearing part according to claim 1, wherein said carbonitrided layer is formed by carbonitriding treatment performed at a treatment temperature in a temperature range of not less than a point $A_1$ and not more than a point $A_{cm}$.

4. The bearing part according to claim 1, wherein said carbonitrided layer is formed by carbonitriding treatment performed at a treatment temperature in a temperature range of not less than 840° C. and not more than 860° C.

5. A bearing manufactured using a bearing part as recited in claim 1.

6. A bearing part made of JIS standard SUJ2 and having a carbonitrided layer formed in a surface thereof,
   wherein, after heat treatment at a heating temperature of 500° C. for a retention time of one hour is performed, a Vickers hardness at a position with a depth of 70 μm from said surface is higher than a Vickers hardness at a core portion, which is a region where said carbonitrided layer is not formed in a thickness direction of said bearing part, by not less than 80 HV,
   wherein a nitrogen concentration in said carbonitrided layer decreases from the surface of the bearing part to the core portion,
   a nitrogen concentration at a depth position of 30 μm from a surface of said bearing part is not less than 0.1 mass %, and
   a nitrogen concentration at a depth position of not less than 15 μm and not more than 40 μm from a depth position having a nitrogen concentration of 0.1 mass % is 0.06 mass %.

7. The bearing part according to claim 6, wherein said carbonitrided layer is formed by carbonitriding treatment performed at a treatment temperature in a temperature range of not less than a point $A_1$ and not more than a point $A_{cm}$.

8. The bearing part according to claim 6, wherein said carbonitrided layer is formed by carbonitriding treatment performed at a treatment temperature in a temperature range of not less than 840° C. and not more than 860° C.

9. A method for inspecting a bearing part, comprising the steps of:
   preparing a bearing part made of JIS standard SUJ2 and having a carbonitrided layer formed in a surface thereof;
   performing heat treatment on said bearing part;
   measuring, after said heat treatment, a first Vickers hardness at a position with a summed depth from said surface, the summed depth being obtained by adding a first distance to a grinding allowance for said surface, and a second Vickers hardness at a core portion, which is a region where said carbonitrided layer is not formed in a thickness direction of said bearing part;
   determining whether or not said first Vickers hardness is higher than said second Vickers hardness by a reference value, and
   determining the nitrogen content of the bearing part at the summed depth from the first Vicker hardness and the second Vickers hardness.

10. The method for inspecting a bearing part according to claim 9, wherein
    said heat treatment is heat treatment at a heating temperature of 500° C. for a retention time of one hour,
    said first distance is 30 μm, and
    said reference value is 130 HV.

11. The method for inspecting a bearing part according to claim 9, wherein
    said heat treatment is heat treatment at a heating temperature of 500° C. for a retention time of one hour,
    said first distance is 70 μm, and
    said reference value is 80 HV.

* * * * *